(12) United States Patent
Tashev et al.

(10) Patent No.: US 8,385,557 B2
(45) Date of Patent: Feb. 26, 2013

(54) MULTICHANNEL ACOUSTIC ECHO REDUCTION

(75) Inventors: Ivan Jelev Tashev, Kirkland, WA (US); Alejandro Acero, Bellevue, WA (US); Nilesh Madhu, Bochum (DE)

(73) Assignee: Microsoft Corporation, Redmond, WA (US)

( * ) Notice: Subject to any disclaimer, the term of this patent is extended or adjusted under 35 U.S.C. 154(b) by 1232 days.

(21) Appl. No.: 12/141,941

(22) Filed: Jun. 19, 2008

(65) Prior Publication Data

US 2009/0316923 A1 Dec. 24, 2009

(51) Int. Cl.
*H04B 3/20* (2006.01)

(52) U.S. Cl. ......... 381/66; 381/83; 381/93; 379/406.01; 379/406.02; 379/406.05; 379/406.14; 379/406.06; 379/406.07; 379/406.08; 379/406.09

(58) Field of Classification Search ............. 381/66, 381/83, 93, 971.11; 379/406.01–406.09, 379/406.14

See application file for complete search history.

(56) References Cited

U.S. PATENT DOCUMENTS

| | | | |
|---|---|---|---|
| 4,627,620 A | 12/1986 | Yang | |
| 4,630,910 A | 12/1986 | Ross et al. | |
| 4,645,458 A | 2/1987 | Williams | |
| 4,695,953 A | 9/1987 | Blair et al. | |
| 4,702,475 A | 10/1987 | Elstein et al. | |
| 4,711,543 A | 12/1987 | Blair et al. | |
| 4,751,642 A | 6/1988 | Silva et al. | |
| 4,796,997 A | 1/1989 | Svetkoff et al. | |
| 4,809,065 A | 2/1989 | Harris et al. | |
| 4,817,950 A | 4/1989 | Goo | |
| 4,843,568 A | 6/1989 | Krueger et al. | |
| 4,893,183 A | 1/1990 | Nayar | |
| 4,901,362 A | 2/1990 | Terzian | |
| 4,925,189 A | 5/1990 | Braeunig | |
| 5,101,444 A | 3/1992 | Wilson et al. | |
| 5,148,154 A | 9/1992 | MacKay et al. | |
| 5,184,295 A | 2/1993 | Mann | |
| 5,229,754 A | 7/1993 | Aoki et al. | |
| 5,229,756 A | 7/1993 | Kosugi et al. | |
| 5,239,463 A | 8/1993 | Blair et al. | |

(Continued)

FOREIGN PATENT DOCUMENTS

| CN | 201254344 B | 6/2010 |
|---|---|---|
| EP | 0583061 A2 | 2/1994 |

(Continued)

OTHER PUBLICATIONS

Kanade et al., "A Stereo Machine for Video-rate Dense Depth Mapping and Its New Applications", IEEE Computer Society Conference on Computer Vision and Pattern Recognition, 1996, pp. 196-202, The Robotics Institute, Carnegie Mellon University, Pittsburgh, PA.

(Continued)

*Primary Examiner* — Disler Paul

(57) ABSTRACT

A multichannel acoustic echo reduction system is described herein. The system includes an acoustic echo canceller (AEC) component having a fixed filter for each respective combination of loudspeaker and microphone signals and having an adaptive filter for each microphone signal. For each microphone signal, the AEC component modifies the microphone signal to reduce contributions from the outputs of the loudspeakers based at least in part on the respective adaptive filter associated with the microphone signal and the set of fixed filters associated with the respective microphone signal.

17 Claims, 11 Drawing Sheets

U.S. PATENT DOCUMENTS

| | | | |
|---|---|---|---|
| 5,239,464 A | 8/1993 | Blair et al. | |
| 5,288,078 A | 2/1994 | Capper et al. | |
| 5,295,491 A | 3/1994 | Gevins | |
| 5,320,538 A | 6/1994 | Baum | |
| 5,347,306 A | 9/1994 | Nitta | |
| 5,385,519 A | 1/1995 | Hsu et al. | |
| 5,405,152 A | 4/1995 | Katanics et al. | |
| 5,417,210 A | 5/1995 | Funda et al. | |
| 5,423,554 A | 6/1995 | Davis | |
| 5,454,043 A | 9/1995 | Freeman | |
| 5,469,740 A | 11/1995 | French et al. | |
| 5,495,576 A | 2/1996 | Ritchey | |
| 5,516,105 A | 5/1996 | Eisenbrey et al. | |
| 5,524,637 A | 6/1996 | Erickson et al. | |
| 5,534,917 A | 7/1996 | MacDougall | |
| 5,563,988 A | 10/1996 | Maes et al. | |
| 5,577,981 A | 11/1996 | Jarvik | |
| 5,580,249 A | 12/1996 | Jacobsen et al. | |
| 5,594,469 A | 1/1997 | Freeman et al. | |
| 5,597,309 A | 1/1997 | Riess | |
| 5,616,078 A | 4/1997 | Oh | |
| 5,617,312 A | 4/1997 | Iura et al. | |
| 5,638,300 A | 6/1997 | Johnson | |
| 5,641,288 A | 6/1997 | Zaenglein | |
| 5,682,196 A | 10/1997 | Freeman | |
| 5,682,229 A | 10/1997 | Wangler | |
| 5,690,582 A | 11/1997 | Ulrich et al. | |
| 5,703,367 A | 12/1997 | Hashimoto et al. | |
| 5,704,837 A | 1/1998 | Iwasaki et al. | |
| 5,715,834 A | 2/1998 | Bergamasco et al. | |
| 5,796,819 A * | 8/1998 | Romesburg | 379/406.09 |
| 5,875,108 A | 2/1999 | Hoffberg et al. | |
| 5,877,803 A | 3/1999 | Wee et al. | |
| 5,913,727 A | 6/1999 | Ahdoot | |
| 5,933,125 A | 8/1999 | Fernie | |
| 5,980,256 A | 11/1999 | Carmein | |
| 5,989,157 A | 11/1999 | Walton | |
| 5,995,649 A | 11/1999 | Marugame | |
| 6,005,548 A | 12/1999 | Latypov et al. | |
| 6,009,210 A | 12/1999 | Kang | |
| 6,054,991 A | 4/2000 | Crane et al. | |
| 6,066,075 A | 5/2000 | Poulton | |
| 6,072,494 A | 6/2000 | Nguyen | |
| 6,073,489 A | 6/2000 | French et al. | |
| 6,077,201 A | 6/2000 | Cheng et al. | |
| 6,098,458 A | 8/2000 | French et al. | |
| 6,100,896 A | 8/2000 | Strohecker et al. | |
| 6,101,289 A | 8/2000 | Kellner | |
| 6,128,003 A | 10/2000 | Smith et al. | |
| 6,130,677 A | 10/2000 | Kunz | |
| 6,141,463 A | 10/2000 | Covell et al. | |
| 6,147,678 A | 11/2000 | Kumar et al. | |
| 6,152,856 A | 11/2000 | Studor et al. | |
| 6,159,100 A | 12/2000 | Smith | |
| 6,173,066 B1 | 1/2001 | Peurach et al. | |
| 6,181,343 B1 | 1/2001 | Lyons | |
| 6,188,777 B1 | 2/2001 | Darrell et al. | |
| 6,215,890 B1 | 4/2001 | Matsuo et al. | |
| 6,215,898 B1 | 4/2001 | Woodfill et al. | |
| 6,226,396 B1 | 5/2001 | Marugame | |
| 6,229,913 B1 | 5/2001 | Nayar et al. | |
| 6,256,033 B1 | 7/2001 | Nguyen | |
| 6,256,400 B1 | 7/2001 | Takata et al. | |
| 6,283,860 B1 | 9/2001 | Lyons et al. | |
| 6,289,112 B1 | 9/2001 | Jain et al. | |
| 6,299,308 B1 | 10/2001 | Voronka et al. | |
| 6,308,565 B1 | 10/2001 | French et al. | |
| 6,316,934 B1 | 11/2001 | Amorai-Moriya et al. | |
| 6,363,160 B1 | 3/2002 | Bradski et al. | |
| 6,384,819 B1 | 5/2002 | Hunter | |
| 6,411,744 B1 | 6/2002 | Edwards | |
| 6,430,997 B1 | 8/2002 | French et al. | |
| 6,476,834 B1 | 11/2002 | Doval et al. | |
| 6,496,598 B1 | 12/2002 | Harman | |
| 6,503,195 B1 | 1/2003 | Keller et al. | |
| 6,539,931 B2 | 4/2003 | Trajkovic et al. | |
| 6,570,555 B1 | 5/2003 | Prevost et al. | |
| 6,633,294 B1 | 10/2003 | Rosenthal et al. | |
| 6,640,202 B1 | 10/2003 | Dietz et al. | |
| 6,661,918 B1 | 12/2003 | Gordon et al. | |
| 6,681,031 B2 | 1/2004 | Cohen et al. | |
| 6,714,665 B1 | 3/2004 | Hanna et al. | |
| 6,731,799 B1 | 5/2004 | Sun et al. | |
| 6,738,066 B1 | 5/2004 | Nguyen | |
| 6,744,887 B1 * | 6/2004 | Berstein et al. | 379/406.08 |
| 6,765,726 B2 | 7/2004 | French et al. | |
| 6,788,809 B1 | 9/2004 | Grzeszczuk et al. | |
| 6,801,637 B2 | 10/2004 | Voronka et al. | |
| 6,873,723 B1 | 3/2005 | Aucsmith et al. | |
| 6,876,496 B2 | 4/2005 | French et al. | |
| 6,937,742 B2 | 8/2005 | Roberts et al. | |
| 6,950,534 B2 | 9/2005 | Cohen et al. | |
| 7,003,134 B1 | 2/2006 | Covell et al. | |
| 7,036,094 B1 | 4/2006 | Cohen et al. | |
| 7,038,855 B2 | 5/2006 | French et al. | |
| 7,039,676 B1 | 5/2006 | Day et al. | |
| 7,042,440 B2 | 5/2006 | Pryor et al. | |
| 7,050,606 B2 | 5/2006 | Paul et al. | |
| 7,058,204 B2 | 6/2006 | Hildreth et al. | |
| 7,060,957 B2 | 6/2006 | Lange et al. | |
| 7,113,918 B1 | 9/2006 | Ahmad et al. | |
| 7,121,946 B2 | 10/2006 | Paul et al. | |
| 7,155,018 B1 | 12/2006 | Stokes et al. | |
| 7,170,492 B2 | 1/2007 | Bell | |
| 7,184,048 B2 | 2/2007 | Hunter | |
| 7,202,898 B1 | 4/2007 | Braun et al. | |
| 7,222,078 B2 | 5/2007 | Abelow | |
| 7,227,526 B2 | 6/2007 | Hildreth et al. | |
| 7,259,747 B2 | 8/2007 | Bell | |
| 7,308,112 B2 | 12/2007 | Fujimura et al. | |
| 7,317,836 B2 | 1/2008 | Fujimura et al. | |
| 7,348,963 B2 | 3/2008 | Bell | |
| 7,352,858 B2 | 4/2008 | Stokes et al. | |
| 7,359,121 B2 | 4/2008 | French et al. | |
| 7,367,887 B2 | 5/2008 | Watabe et al. | |
| 7,379,563 B2 | 5/2008 | Shamaie | |
| 7,379,566 B2 | 5/2008 | Hildreth | |
| 7,389,591 B2 | 6/2008 | Jaiswal et al. | |
| 7,412,077 B2 | 8/2008 | Li et al. | |
| 7,421,093 B2 | 9/2008 | Hildreth et al. | |
| 7,430,312 B2 | 9/2008 | Gu | |
| 7,436,496 B2 | 10/2008 | Kawahito | |
| 7,450,736 B2 | 11/2008 | Yang et al. | |
| 7,452,275 B2 | 11/2008 | Kuraishi | |
| 7,460,690 B2 | 12/2008 | Cohen et al. | |
| 7,489,812 B2 | 2/2009 | Fox et al. | |
| 7,536,032 B2 | 5/2009 | Bell | |
| 7,555,142 B2 | 6/2009 | Hildreth et al. | |
| 7,560,701 B2 | 7/2009 | Oggier et al. | |
| 7,570,805 B2 | 8/2009 | Gu | |
| 7,574,020 B2 | 8/2009 | Shamaie | |
| 7,576,727 B2 | 8/2009 | Bell | |
| 7,590,262 B2 | 9/2009 | Fujimura et al. | |
| 7,593,552 B2 | 9/2009 | Higaki et al. | |
| 7,598,942 B2 | 10/2009 | Underkoffler et al. | |
| 7,607,509 B2 | 10/2009 | Schmiz et al. | |
| 7,620,202 B2 | 11/2009 | Fujimura et al. | |
| 7,668,340 B2 | 2/2010 | Cohen et al. | |
| 7,680,298 B2 | 3/2010 | Roberts et al. | |
| 7,683,954 B2 | 3/2010 | Ichikawa et al. | |
| 7,684,592 B2 | 3/2010 | Paul et al. | |
| 7,701,439 B2 | 4/2010 | Hillis et al. | |
| 7,702,130 B2 | 4/2010 | Im et al. | |
| 7,704,135 B2 | 4/2010 | Harrison, Jr. | |
| 7,710,391 B2 | 5/2010 | Bell et al. | |
| 7,729,530 B2 | 6/2010 | Antonov et al. | |
| 7,746,345 B2 | 6/2010 | Hunter | |
| 7,760,182 B2 | 7/2010 | Ahmad et al. | |
| 7,809,167 B2 | 10/2010 | Bell | |
| 7,834,846 B1 | 11/2010 | Bell | |
| 7,852,262 B2 | 12/2010 | Namineni et al. | |
| RE42,256 E | 3/2011 | Edwards | |
| 7,898,522 B2 | 3/2011 | Hildreth et al. | |
| 8,035,612 B2 | 10/2011 | Bell et al. | |
| 8,035,614 B2 | 10/2011 | Bell et al. | |
| 8,035,624 B2 | 10/2011 | Bell et al. | |
| 8,072,470 B2 | 12/2011 | Marks | |

| | | | |
|---|---|---|---|
| 2006/0147063 | A1 | 7/2006 | Chen |
| 2006/0153360 | A1* | 7/2006 | Kellermann et al. .... 379/406.08 |
| 2006/0188089 | A1 | 8/2006 | Diethorn et al. |
| 2007/0230712 | A1* | 10/2007 | Belt et al. ................. 381/71.1 |
| 2007/0258578 | A1 | 11/2007 | Hirai et al. |
| 2007/0263850 | A1 | 11/2007 | Stokes et al. |
| 2008/0008333 | A1 | 1/2008 | Nishikawa et al. |
| 2008/0026838 | A1 | 1/2008 | Dunstan et al. |
| 2008/0031469 | A1 | 2/2008 | Haulick et al. |
| 2008/0031471 | A1* | 2/2008 | Haulick et al. ............... 381/86 |

FOREIGN PATENT DOCUMENTS

| | | |
|---|---|---|
| EP | 1848243 | 10/2007 |
| JP | 08044490 A1 | 2/1996 |
| WO | 93/10708 A1 | 6/1993 |
| WO | 97/17598 A1 | 5/1997 |
| WO | 99/44698 A1 | 9/1999 |

OTHER PUBLICATIONS

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

Avendano, et al., "STFT-Based Multi-Channel Acoustic Interference", Proceedings. (ICASSP '01). 2001 IEEE International Conference on, Date: 2001, pp. 625-628, vol. 1.

Chhetri, et al., "Regression-Based Residual Acoustic Echo Suppression", International Workshop on Acoustic Echo and Noise Control, IWAENC 2005, Date: Sep. 12-15, 2005, pp. 201-204.

Reuven, et al., "Joint Noise Reduction and Acoustic Echo Cancellation Using the Transfer Function Generalized Sidelobe Canceller", Date: 2007, pp. 623-635, vol. 49, Issue: 7-8, Publisher: Elsevier Science Publishers B. V. Amsterdam, The Netherlands.

"Combined Acoustic Noise and Echo Canceller (CANEC)" 3 Pages, http://www.dspalgorithms.com/products/canec.html.

* cited by examiner

MULTICHANNEL ACOUSTIC ECHO REDUCTION

BACKGROUND

Microphones are used in many devices to capture one or more human voices. Examples of such devices include speakerphones, hands-free mobile phones, VOIP systems, voice controlled devices/software employing speech recognition, and other types of systems which use and/or communicate human voices captured using a microphone.

Such devices often include a loudspeaker which outputs audible sounds generated from or communicated to the device that includes the microphone. For example, a speakerphone may include a loudspeaker which outputs the voices and other noises communicated from a phone or another speakerphone located in a remote far-end room.

Audible sounds being output by a loudspeaker in a near-end room speakerphone may be captured by the microphone and cause negative audible characteristics for the device, such as a delayed echo, feedback generation, and reverberation which degrades any spoken voices intended to be captured by the microphone of the speakerphone. To overcome such negative audible characteristics, acoustic echo reduction may be employed to estimate what portion of the signal sent to the loudspeaker is captured by the microphone, and to subsequently remove the estimated portion of the signal from the actual signal captured by the microphone to leave substantially only the spoken voices and/or other near-end room sounds captured by the microphone.

Many devices and systems that require acoustic echo reduction, however, are evolving to include multichannel (e.g., stereo and/or surround sound) loud speakers. Multiple loudspeakers increase the difficulty of effectively removing portions of the signals detected by one or more microphones contributed by the multiple loudspeakers from a received signal. Many echo reduction systems may not scale sufficiently to effectively carry out echo reduction on a multichannel loudspeaker system.

SUMMARY

The following is a brief summary of subject matter that is described in greater detail herein. This summary is not intended to be limiting as to the scope of the claims.

Described herein are various technologies relating to multichannel acoustic echo reduction. An example multichannel acoustic echo reduction system may be employed in a device having both a plurality of loudspeaker channels (e.g., stereo or surround sound loudspeakers) and a microphone array having a plurality of microphones integrated therein.

The system may include an acoustic echo canceller (AEC) component that filters each signal from the respective microphones based at least in part on the audio signals being outputted through the loudspeakers. For each different combination of microphones and loudspeakers in the device, the AEC component may have a corresponding fixed filter capable of filtering the signal associated with its corresponding loudspeaker. For each set of fixed filters associated with a microphone, the system may include one adaptive filter that produces an output based at least in part on a combination of the outputs from the associated fixed filters and the signal from the associated microphone. The example system subtracts the output from each adaptive filter from the respective signal acquired by the microphone associated with the adaptive filter, to produce a filtered output for each microphone.

Before the system operates and/or subsequently to operation of the system, the fixed filters may be calibrated to be capable of producing outputs corresponding to an estimate of what portions of the plurality of signals sent to the loudspeakers will be captured by each of the microphones. Such calibration may be carried out by a calibration component that provides chirps or other acoustic information sequentially at each loudspeaker to analyze the contribution each loudspeaker provides to each microphone signal. The calibration component may determine coefficients from information provided by the chirps for use in operating the fixed filters.

In the example system, the adaptive filters may modify the outputs of the fixed filters to continuously account for acoustic changes in the environment including the loudspeakers and microphones after the fixed filters were initially calibrated (e.g., movement of people, opening and closing of doors, . . . ). The example system may also include a tracker component that is operative to determine changes in the relative positions of the speakers and/or microphones. The tracker component may trigger the calibration component to recalibrate the fixed filters when a sufficient change in the positions of the speakers and/or microphones is detected.

The system may also include a beamformer that uses the plurality of filtered outputs from the adaptive filters to output a combined filtered signal substantially focused on the portions of the acoustic information corresponding to a currently or dominant speaking voice. The output from the beamformer may then be further filtered by an acoustic echo suppression (AES) component to further minimize residual echo and/or noise remaining after the AEC and beamformer components have filtered the microphone signals.

The output of the AES component may correspond to a single channel signal substantially focused on speaking voices in which background sounds initially provided by the device's multiple loudspeakers have been subtracted out of the signal. In devices for use in telecommunications (e.g., speakerphones) the signal may be communicated to a remote phone or speakerphone. In devices that are voice controlled, the signal may undergo speech recognition to distinguish different commands or other verbal information used in the operation of the device.

Other aspects will be appreciated upon reading and understanding the attached figures and description.

DETAILED DESCRIPTION

Figure 1:
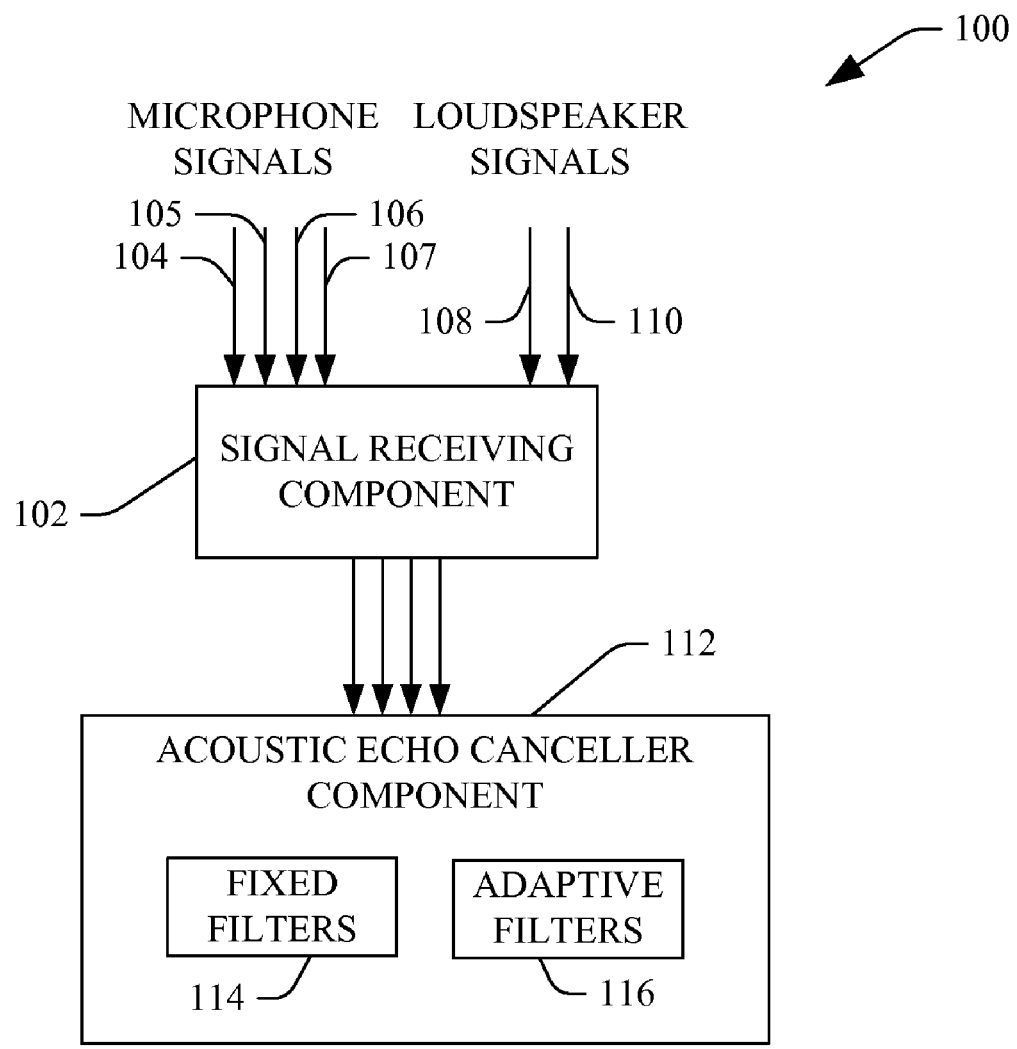
FIG. 1 is a functional block diagram of an example multichannel acoustic echo reduction system.

Various technologies pertaining to reducing acoustic echo and noise captured by a microphone array in a multichannel loudspeaker device will now be described with reference to the drawings, where like reference numerals represent like elements throughout. In addition, several functional block diagrams of example systems are illustrated and described herein for purposes of explanation; however, it is to be understood that functionality that is described as being carried out by certain system components may be performed by multiple components. Similarly, for instance, a component may be configured to perform functionality that is described as being carried out by multiple components.

With reference to FIG. 1, an example multichannel acoustic echo reduction system 100 is illustrated that facilitates reduction of echo and noise in microphone signals. The example system 100 may be used in telecommunication systems (e.g., speakerphones), multimedia devices, and/or voice controlled devices and software. Examples of such devices employing the example system 100 will be described in more detail below with respect to FIGS. 6-8.

The example system 100 may include a signal receiving component 102 that receives a plurality of microphone signals 104, 105, 106, 107 and a lesser plurality of loudspeaker signals 108, 110. The plurality of loudspeaker signals drive a plurality of respective loudspeakers included with the particular device that employs the example multichannel acoustic echo reduction system 100. The plurality of microphone signals 104-107 are generated by a plurality of respective microphones included with the particular device that employs the example system. Such microphone signals typically include acoustic information captured from outputs of the loudspeakers as well as other sounds such as speaking voices and other noises in a near-end room that includes the device employing the example system.

The example system also includes an acoustic echo canceller (AEC) component 112 that operates to filter the microphone signals. The AEC component 112 has a plurality of fixed filters 114 and a lesser plurality of adaptive filters 116. In this example system 100, the AEC may include a fixed filter for each respective combination of loudspeaker and microphone signals. In addition, the AEC may also include an adaptive filter for each microphone signal. The AEC component 112 modifies each respective microphone signal to reduce contributions from the outputs of the loudspeakers based at least in part on the respective adaptive filter associated with the respective microphone signal and the set of fixed filters associated with the respective microphone signal.

In this example system, the fixed filters 114 may be calibrated for the particular spatial arrangement of loudspeakers and microphones to produce outputs corresponding to an estimate of the portions of the plurality of signals sent to the loudspeakers that will be captured by each of the microphones. The adaptive filters 116 modify the outputs of the fixed filters to continuously account for acoustic changes in the near-end room environment including the loudspeakers and microphones after the fixed filters where initially calibrated. Such changes may include movement of people and/or objects in the room in which sound waves travel between the loudspeakers and microphones.

Figure 2:
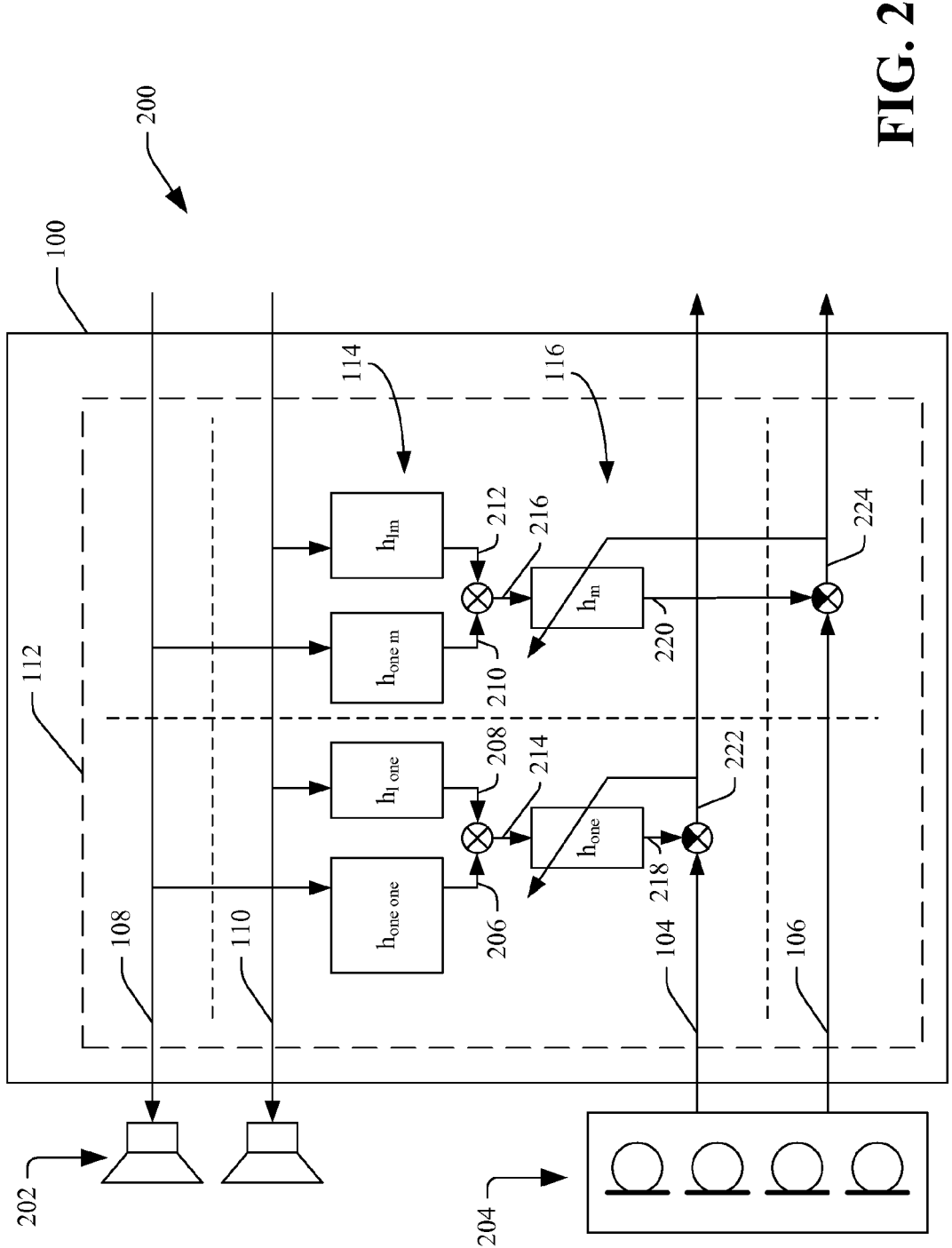
FIG. 2 is a functional block diagram of an example system, illustrating an example structure for an acoustic echo canceller component.

FIG. 2 illustrates an example structure 200 for the AEC component 112. FIG. 2 also illustrates examples of a plurality of loudspeakers 202 that are driven by the loudspeaker signals 108-110. In addition, FIG. 2 illustrates examples of a plurality of microphones 204 that capture outputs from the loudspeakers 202 as well as other sounds such as human speech and noises.

The example structure 200 may be employed in software or hardware, depending on the performance requirements for the device using the system. In an example system implemented in software, the AEC component 112 may generate an appropriate number of instances of the fixed filters and adaptive filters dynamically based on the detected and/or configured number of microphones and loudspeakers used in the device.

As discussed previously, the number of fixed and adaptive filters is based on the number of loudspeaker and microphone signals. A system that receives a quantity of L loudspeaker signals (one for each loudspeaker) and a quantity of M microphone signals (one for each microphone), will have a quantity of L×M fixed filters. For example, a system receiving two stereo loudspeaker signals and four microphone signals will have an AEC component with eight (e.g., 2×4) fixed filters. In addition, such an example system will have four adaptive filters (one for each microphone signal).

In addition, although FIG. 2 depicts four microphones 204, to simplify the drawing, only two microphone signals (104 and 106) are shown out of the four microphones 204 depicted (i.e. microphone signals 105 and 107 of FIG. 1 are not shown).

Thus, in FIG. 2 only two adaptive filters (e.g., $h_{one}$ and $h_m$) are shown, which correspond respectively to the two microphone signals 104 and 106. Also, only four fixed filters are shown ($h_{one\ one}$, $h_{1\ one}$, $h_{one\ m}$, and $h_{1m}$), which respectively correspond to the different combinations of loudspeaker signals 108 and 110 and microphone signals 104 and 106 that are shown. It is to be understood that in an implementation of the described example system, corresponding sets of fixed filters and individual adaptive filters would be associated with the two microphone signals 105 and 107 that are not shown. Also, it to be understood that alternative examples may have one or more microphones and associated microphone signals depending on the acoustic and/or performance characteristics desired for the system. In addition, as used herein the subscript l refers to a given loudspeaker signal and ranges in value from 1 to L. Similarly, the subscript m refers to a given microphone signal and ranges in value from 1 to M.

Each respective fixed filter $h_{one\ one}$, $h_{1\ one}$, $h_{one\ m}$, and $h_{1m}$ generates a respective output 206, 208, 210, 212 based at least in part on the particular loudspeaker signal 108, 110 associated with each respective fixed filter. Also, as will be discussed in more detail below, each fixed filter operates on an associated loudspeaker signal based on coefficients configured for the respective fixed filter with respect to one of the microphone signals.

In the example system, outputs from each subset of fixed filters calibrated with respect to a common microphone signal are combined (e.g., added together) to form a combined output 214, 216. For example as shown in FIG. 2, outputs 206, 208 from fixed filters $h_{one\ one}$ and $h_{1\ one}$ are combined to form combined output 214; and outputs 210, 212 from fixed filters $h_{one\ m}$, and $h_{1m}$ are combined to form combined output 216.

Then the adaptive filter associated with the respective subset of fixed filters generates an output 218, 220 based at least in part on the combined outputs from the fixed filters associated with the respective microphone signal and configuration values associated with the adaptive filter. For example, as shown in FIG. 2, the adaptive filter $h_{one}$ generates output 218 based at least in part on the combined output 214 of the fixed filters $h_{one\ one}$ and $h_{1\ one}$ calibrated with respect to the microphone signal 104 and configuration values associated with the adaptive filter $h_{one}$. Also, for example, the adaptive filter $h_m$ generates output 220 based at least in part on the combined output 216 of the fixed filters $h_{one\ m}$ and $h_{1m}$ calibrated with respect to the microphone signal 106 and configuration values associated with the adaptive filter $h_m$.

The configuration values may be continually updated by the AEC component 112 based at least in part on the respective microphone signal associated with the adaptive filter and previous configuration values associated with the respective adaptive filter. For example, as shown in FIG. 2, configuration values for adaptive filter $h_{one}$ may be updated based at least in part on the microphone signal 104 and previous configuration values for the adaptive filter $h_{one}$. Also, for example, configuration values for adaptive filter $h_m$ may be updated based at least in part on the microphone signal 106 and previous configuration values for the adaptive filter $h_m$.

In this example structure 200, for each microphone signal 104, 106, the AEC component 112 respectively combines (e.g., subtracts) the respective outputs 218, 220 from the respective associated adaptive filters $h_{one}$ and $h_m$ with the respective microphone signals 104, 106 to produce respective filtered microphone signals 222, 224. For example, as shown in FIG. 2, the output 218 from the adaptive filter $h_{one}$ is subtracted from the associated microphone signal 104 to produce the filtered microphone signal 222. Similarly, the output 220 from the adaptive filter $h_m$ is subtracted from the associated microphone signal 106 to produce the filtered microphone signal 224.

In the example system 100, for each microphone signal, the respective associated adaptive filter includes a finite impulse response (FIR) filter with a predetermined length to generate an output corresponding to an approximation of a transfer function between the respective microphone signal and the combination of the outputs from the fixed filters associated with the respective microphone signal. In examples, the adaptive filters may employ adaptive echo canceller algorithms such as LMS (least mean square), NLMS (normalized least mean square), and RLS (recursive least squares) or other echo canceller algorithms such as those used in mono AEC systems. The arrangement of one adaptive filter per microphone in the example system limits the degrees of freedom for the adaptation process, which thereby reduces the opportunity for the adaptive filter to converge on one of many undesirable solutions.

As mentioned previously, the fixed filters may be calibrated in view of the respective mutual positions of the microphones and speakers in the device that uses the example multichannel acoustic echo reduction system. Such calibration may be carried out initially before it is first used. As a result, the fixed filters are initialized with an optimal or close to optimal solution before the system starts operating.

In devices with a structurally fixed arrangement of speakers and microphones (e.g., a display monitor, car music system, or speakerphone, with built in stereo/surround speakers and microphones), the fixed filters may be calibrated during manufacture of the device to produce respective sets of coefficients stored in a memory of the device for later use with operating each respective fixed filter. In devices with individually movable speakers and/or microphones, the system may be capable of calibrating the fixed filters each time the system is started.

Figure 3:
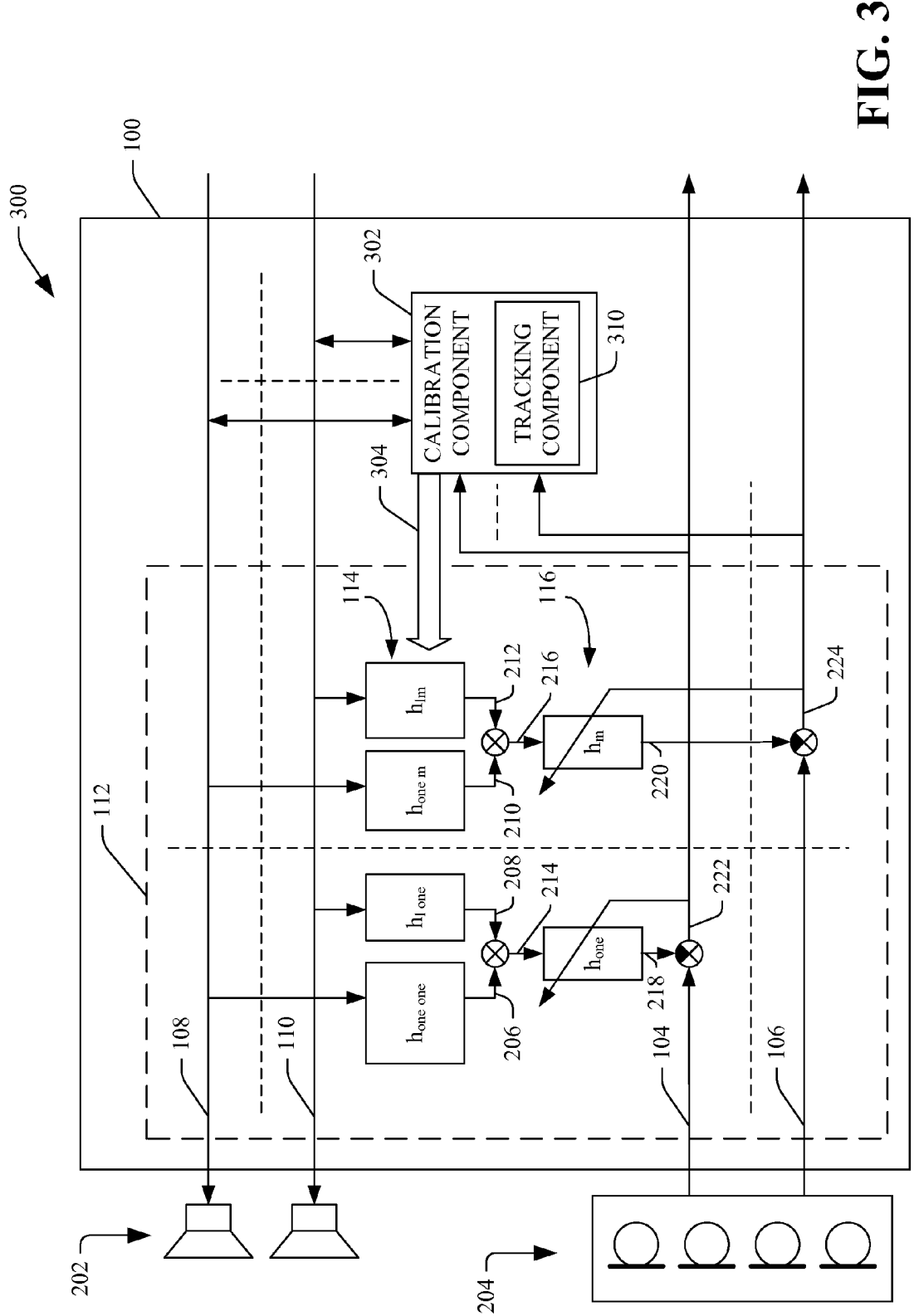
FIG. 3 is a functional block diagram of an example system, illustrating a calibration component and a tracking component.

FIG. 3 illustrates an example system 300 that includes a calibration component 302 that provides coefficients 304 that configure each of the fixed filters 114. Upon initialization of the system 300 (and optionally subsequently) the calibration component 302 may determine the coefficients by sequentially including a calibration signal in each loudspeaker signal, which calibration signal causes the respective loudspeakers to sequentially output chirps or other predetermined sounds.

The calibration component 302 can determine the coefficients for each fixed filter based at least in part on the corresponding acoustic information captured by the microphone signals during the time periods for which the calibration signals are included in the loudspeaker signals. The time sequences from each microphone and loudspeaker during the calibration process are converted by the calibration component 302 to the frequency domain for each frequency bin, resulting in input sequences $X_m(k)$ and $Z_l(k)$. The calibration component 302 may be configured to ensure that the number of frames in the chirp signal is larger than the number of taps in a frequency domain filter P for the fixed filters. Then for each microphone signal, the calibration component 302 can solve an overloaded system of complex equations corresponding to:

$$H_m Z^{(n)} = X_m^{(n)} \quad (1)$$

where $H_m = [H_{m1}, H_{m2}, \ldots, H_{mL}]$, and $Z = [Z_1, Z_2, \ldots, Z_L]$. Each $H_{ml}$ is a P-tap filter for the transfer function between the m-th microphone and the l-th loudspeaker for the k-th frequency bin (omitted for simplicity).

Each $Z_l = [Z_l^{(n)}, Z_l^{(n-1)}, \ldots, Z_l^{(n-P+1)}]^T$ is a vector-column, containing the last P values of the speaker signals $Z_l^{(n)} = [Z_l^{(n)}, Z_l^{(n-1)}, \ldots, Z_l^{(n-P+1)}]^T$. This described overloaded system of complex equations may be solved for each frequency bin and for each microphone signal. In an example, the calibration component 302 may use an MMSE (minimum mean square error) algorithm to find the solution for the initial coefficients used to configure each of the fixed filters.

Although the example configuration component 302 has been described as using sequential calibration signals to determine coefficients for the fixed filters, it is to be understood that in alterative examples, the calibration component may use other procedures to determine the coefficients, such as using prior information about the mutual positions of the loudspeakers and microphones. For example in a device such as a computer monitor, the geometry for the loudspeaker and microphone positions may be permanently fixed therein. The calibration component may determine the coefficients for the fixed filters based on this known geometry and a sound delay detected between the output of loudspeaker signals and the capture of such signals via the microphones.

Once the initial coefficients for the fixed filter banks $H_{lm}$ and adaptive filter banks $H_m$ are calculated for each microphone signal and frequency bin, the output signal from the AEC component 112 (FIG. 1) in the absence of further speech or noise inputs to the microphones may correspond to:

$$Y_m^{(n)} = (\Sigma_{l=1}^L \overline{H}'_{lm} Z_l^{(n)}) - (\Sigma_{l=1}^L H'_{lm} Z_l^{(n)}) H_m. \quad (2)$$

Here $H_{lm}$ corresponds to the actual transfer function between the corresponding loudspeaker and microphone. As immediately after the calibration $H_{lm} \approx H_{lm}$ (with some calibration errors) and $H_m = 1$, significant echo suppression may be achieved. At some later moment due to some movements in the room adjacent the loudspeakers and microphones, the actual transfer function may change to $\underline{H}_{lm}+\Delta H_{lm}$ which can result in the output signal from AEC component 112 corresponding to:

$$Y_m^{(n)} = (\Sigma_{l=1}^L \overline{H}_{lm} Z_l^{(n)}) - (\Sigma_{l=1}^L H'_{lm} Z_l^{(n)}) + (\Sigma_{l=1}^L \Delta \overline{H}'_{lm} Z_l^{(n)}) - (\Sigma_{l=1}^L H'_{lm} Z_l^{(n)})(H_m - 1). \quad (3)$$

Here the difference of the first two terms will be approximately zero in equation (3) due to the initial calibration, and after merging the two sums, the resulting output signal corresponds to:

$$Y_m^{(n)} = \Sigma_{l=1}^L (\Delta \overline{H}'_{lm} - H'_{lm}(H_m - 1)) Z_l^{(n)}. \quad (4)$$

To substantially minimize echo, the adaptive filter can be estimated such that the $H_m$ minimize:

$$E\{\|\Sigma_{l=1}^L (\Delta \overline{H}'_{lm} - H'_{lm}(H_m - 1)) Z_l^{(n)}\|^2\} \quad (5)$$

where $E\{.\}$ is the statistical expectation operator. This indicates an MMSE solution to which the adaptive filter is capable of converging.

Changes in the acoustic properties in the near-end room may cause an increase in the echo residual due to the approximate solution carried by the adaptive filters. If the changes are due only to movement in the room (e.g., moving people and the opening/or closing of a door), then $\|\overline{H}_{lm}\|^2 >> \|\Delta \overline{H}_{lm}\|^2$ and the non-compensated residual will have low energy.

Figure 4:
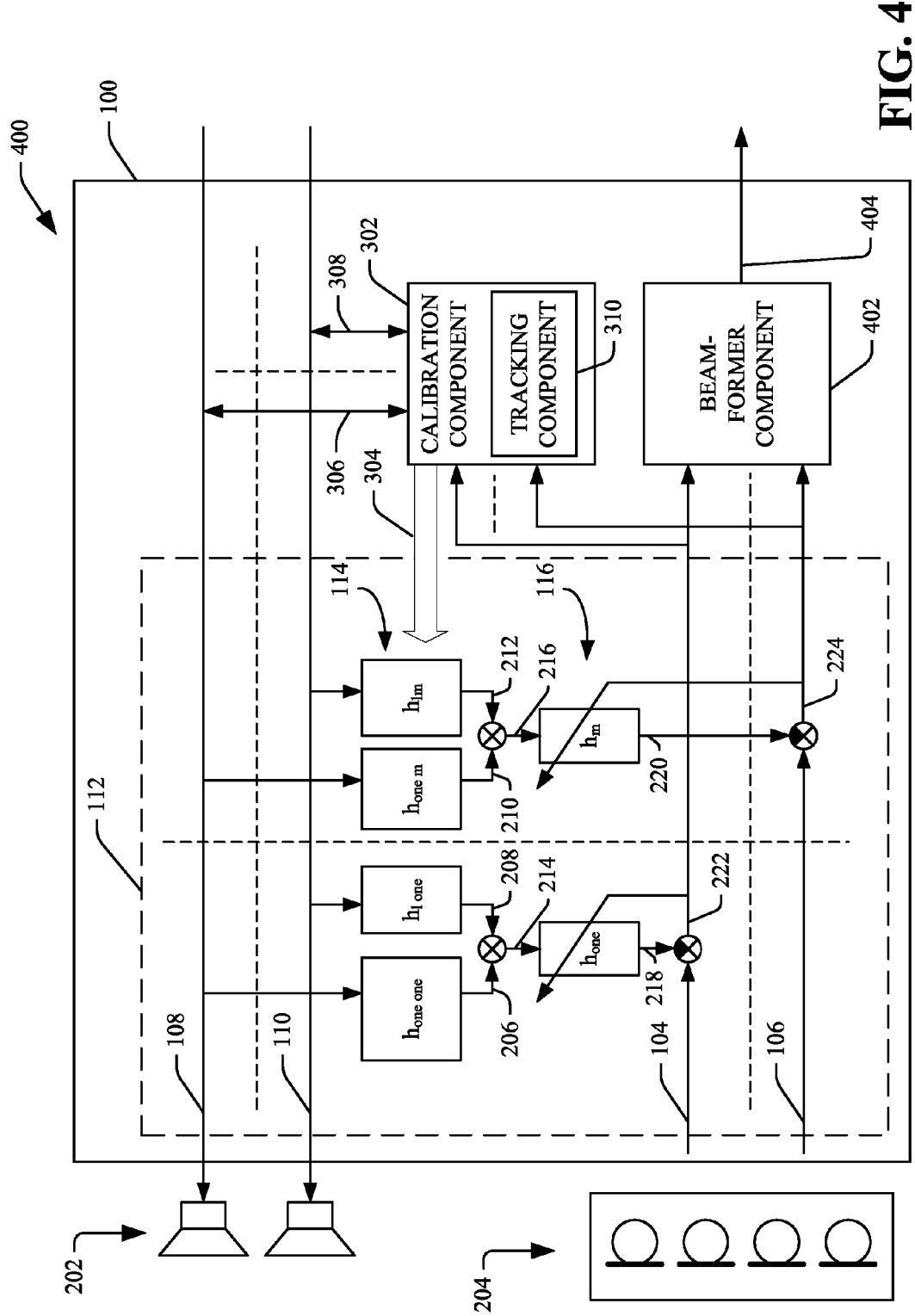
FIG. 4 is a functional block diagram of an example system, illustrating a beamformer component.

In FIG. 4, an example system 400 that can facilitate suppression of the residual is illustrated. The system 400 can include a beamformer component 402 that may be used to suppress the net residual from the combined single channel output after the beamformer. In this example, the beamformer component 402 may produce a single output 404 (focused on the currently dominant speaking voice) based at least in part on the filtered outputs 222, 224 (e.g., the filtered microphone signals) of the AEC component 112. Thus in addition to extracting acoustic information corresponding to the current dominant speaking voice in the near-end room, the beamformer component 402 may further improve the quality of the filtered signals by minimizing the residual echo left from the AEC component 112.

However, although residual echo may be suppressed by the beamformer component 402, the output 404 from the beamformer component 402 may continue to include a reverberation tail which typically remains relatively constant regardless of the beam switching carried out by the beamformer component 402. Such a reverberation tail may be heavier than usual in the case of surround sound loudspeakers in which at least two of the loudspeakers (e.g., rear channels) may be relatively farther from the microphones than other loudspeakers (e.g., front and center channels) and this reverberation tail may still be loud enough to degrade the audio quality of the signals after the AEC component and beamformer component.

Figure 5:
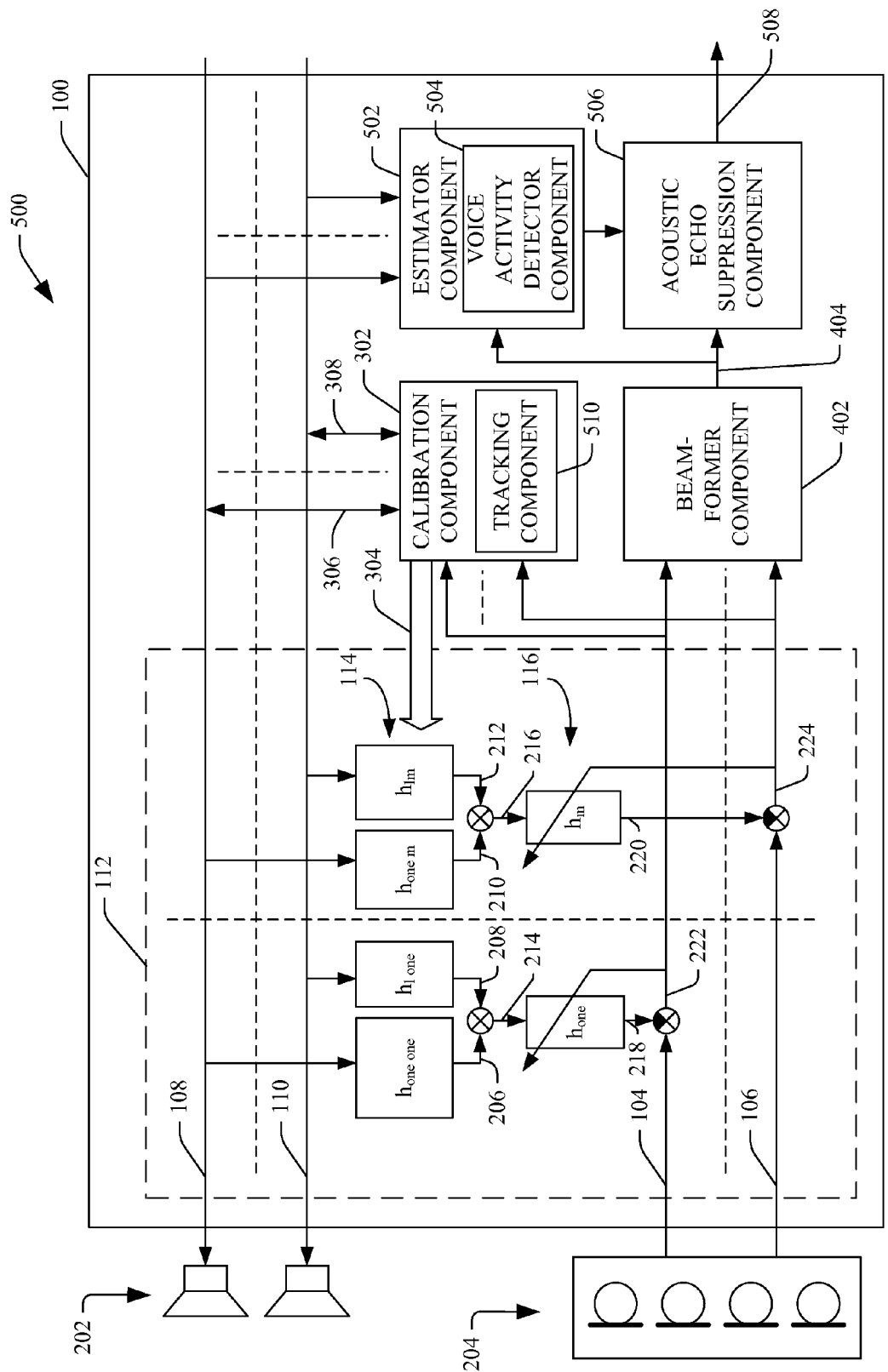
FIG. 5 is a functional block diagram of an example system, illustrating an acoustic suppression component.

With reference now to FIG. 5, an example system 500 that can be employed in connection with suppressing a reverberation tail is illustrated. The system 500 may include an acoustic echo suppression (AES) component 506. Such an AES component may produce an output 508 which suppresses the energy of the reverberation tail that remains in the output 404 of the beamformer component 402. The AES component 506 may use an algorithm such as a Wiener gain, Ephraim and Malah, or other AES algorithms.

The system 500 may additionally include an estimator component 502 that estimates the residual energy based on the original loudspeaker signals. The AES component 506 in this example may suppress the reverberation tail based at least in part on an estimate of the residual determined by the estimator component 502. The estimate may be determined during periods when there is no near-end room speech. To determine when near-end room speech is not being picked up by the microphones 204, the estimator component may include a voice activity detector component 504 that detects the presence of speech in the output 404 of the beamformer (or a preceding output/signal from the microphones 204).

As discussed previously, the adaptive filters of the AEC component 112 may account for small changes in the acoustic properties of the near-end room such as caused by movement of people and objects. In addition the example systems (such as systems 300, 400, 500 depicted in FIGS. 3-5) may be capable of monitoring the filtered microphone signals to detect changes in individual loudspeaker volumes and/or changes in the relative positions of the loudspeakers with respect to the microphones. Based on the detected changes, the example system may be capable of adjusting the fixed filters without a need for a recalibration. In this regard, example systems may include a tracking component 510. Such a tracking component may monitor the filtered microphone signals 222, 224 of the AEC component 112 for an indication that the relative positions between the microphones and/or loudspeakers have changed and cause the fixed filters to be adjusted accordingly. When necessary, the example tracking component 510 may also trigger the calibration component 302 to re-calibrate the fixed filters and re-initialize the adaptive filters. In examples with a tracking component 510, the number of microphones is typically greater than the number of loudspeakers (e.g. M>L) to facilitate accurate tracking of relative movement of the microphones and loudspeakers.

Figure 6:
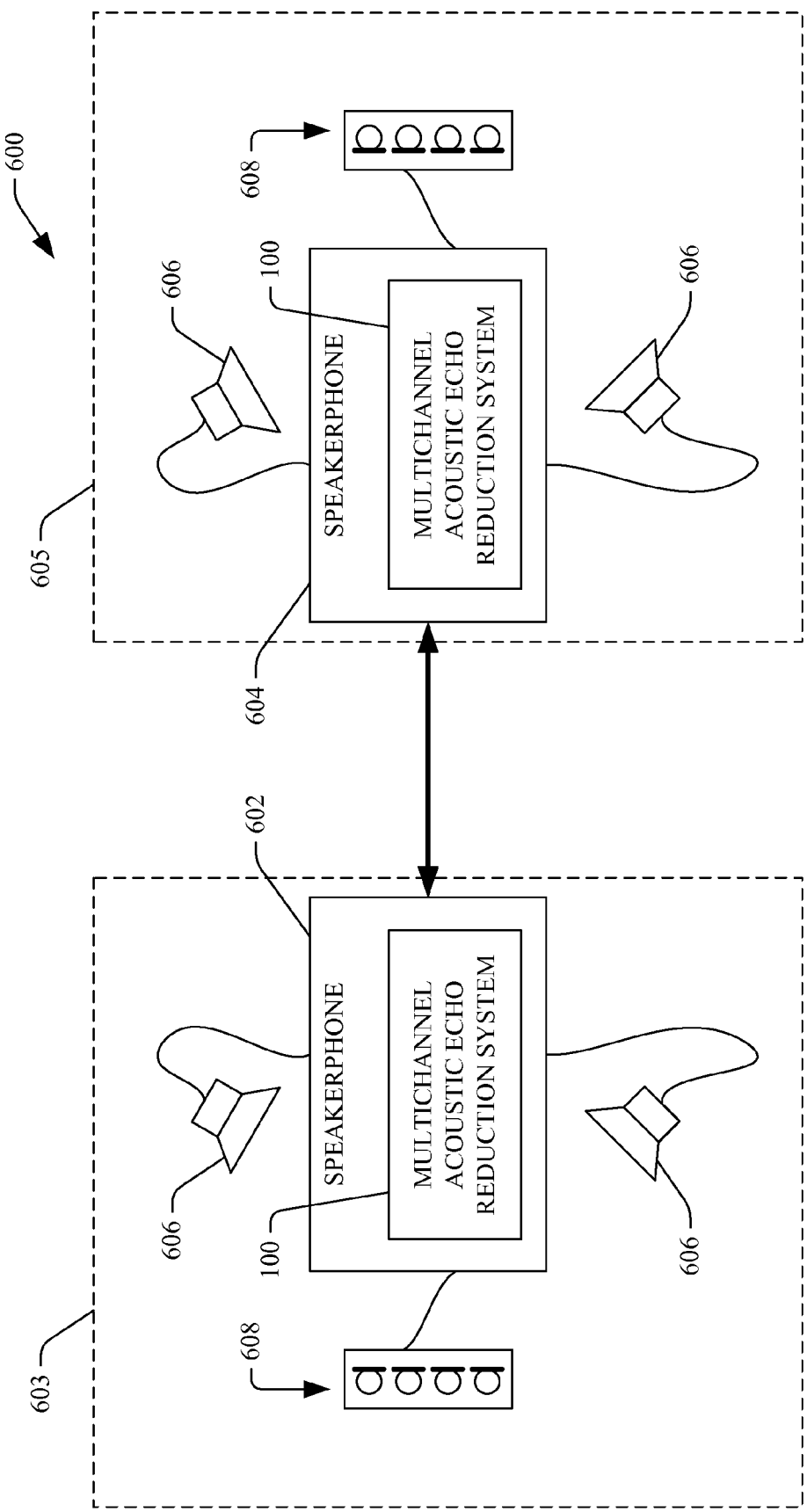
FIG. 6 is a functional block diagram of an example system, illustrating a telecommunication system that includes speakerphones with an example multichannel acoustic echo reduction system.

FIG. 6 illustrates an example telecommunication system 600 employing an example of a multichannel acoustic echo reduction system (e.g., the system 100) in speakerphones 602 and 604, respectively located in separate and remote rooms 603, 605. In this example, the speakerphones 602 and 604 include respective stereo loudspeakers 606. Such loudspeakers may be built into the housing of the speakerphone. However, such loudspeakers may alternatively correspond to movable satellite speakers that may be positioned at different locations away from the base of the speakerphone.

In addition, in this example, each speakerphone may include more than two microphones 608 (e.g., four microphones) spaced apart in the speakerphone housing. However, such microphones may alternatively be integrated into a movable microphone array that includes the microphones in a spaced apart arrangement in a common housing that is separate from the base of the speakerphone. In such an example with four microphones and two speakers, the AEC component 112 can include eight fixed filters (e.g., 2 speakers×4 microphones) and may include four adaptive filters (one for each of the 4 microphones).

Figure 7:
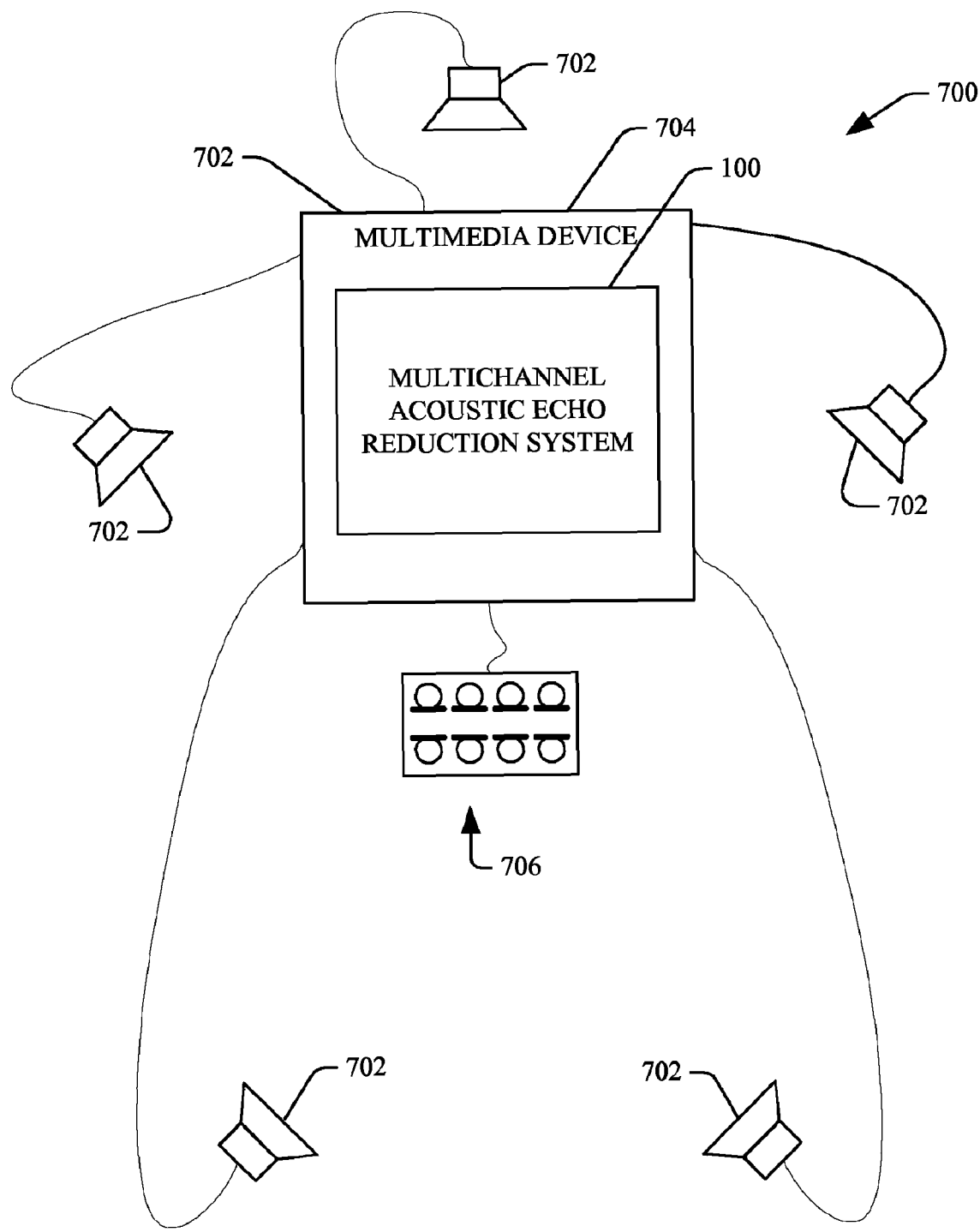
FIG. 7 is a functional block diagram of an example system, illustrating a multimedia device with an example multichannel acoustic echo reduction system.

FIG. 7 illustrates an example system 700 employing an example of the multichannel echo reduction system 100 with loudspeakers 702 configured in a surround sound arrangement (e.g., 5.1., 7.1., etc. channels). Here the example system 700 may include a multimedia device 704 such as a PC, a home theater system, a vehicle based entertainment system, or other device with multichannel audio. Also, the multimedia device 704 may correspond to a higher end speakerphone system configured for example as part of a video conferencing system. In FIG. 7, a five loudspeaker surround sound system is shown in which a subwoofer is omitted. The system may include a plurality of microphones 706 incorporated into a microphone array with eight (or more) spaced apart microphones. In such an example with eight microphones and five speakers, the AEC component 112 in the multichannel acoustic echo reduction system 100 for the example system 700 will include 40 fixed filters (e.g., 5 speakers×8 microphones) and will include eight adaptive filters (one for each of the 8 microphones).

Figure 8:
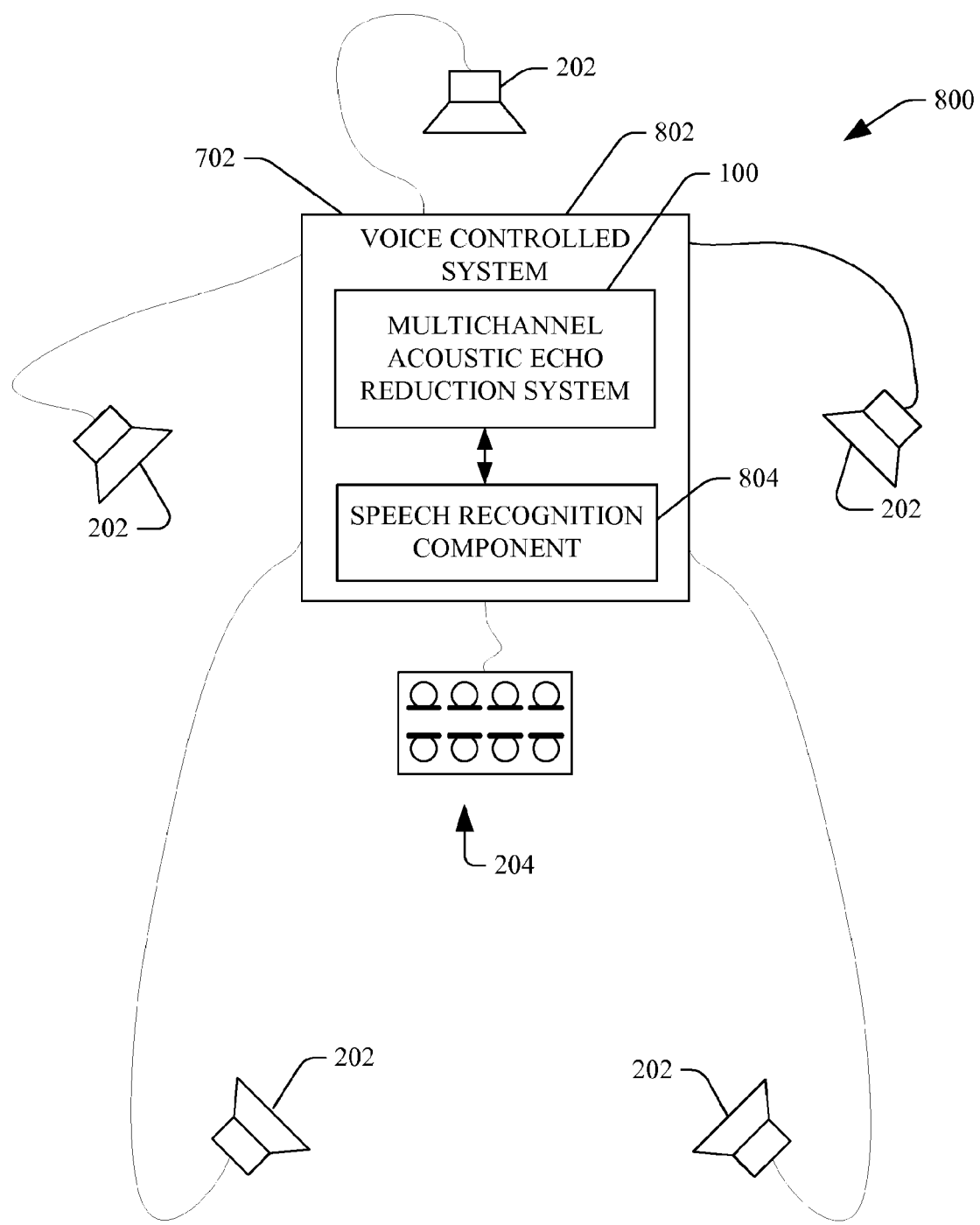
FIG. 8 is a functional block diagram of an example system, illustrating a voice controlled system with an example multichannel acoustic echo reduction system.

FIG. 8 illustrates another example system 800 employing an example of the multichannel echo reduction system 100 with loudspeakers 202 configured in a multichannel arrangement (e.g., stereo, surround sound arrangement). Here the example system 800 may include a voice controlled system 802 that uses the multichannel acoustic echo reduction system 100 to capture commands and/or other speech from a user while outputting music or other sounds through the surround sound speakers. Such a voice controlled system for example may include a software program executing on a PC or other device that uses a speech recognition component 804 that determines words and/or commands from the speech included in the output signal of the multichannel acoustic echo reduction system 100.

Figure 9:
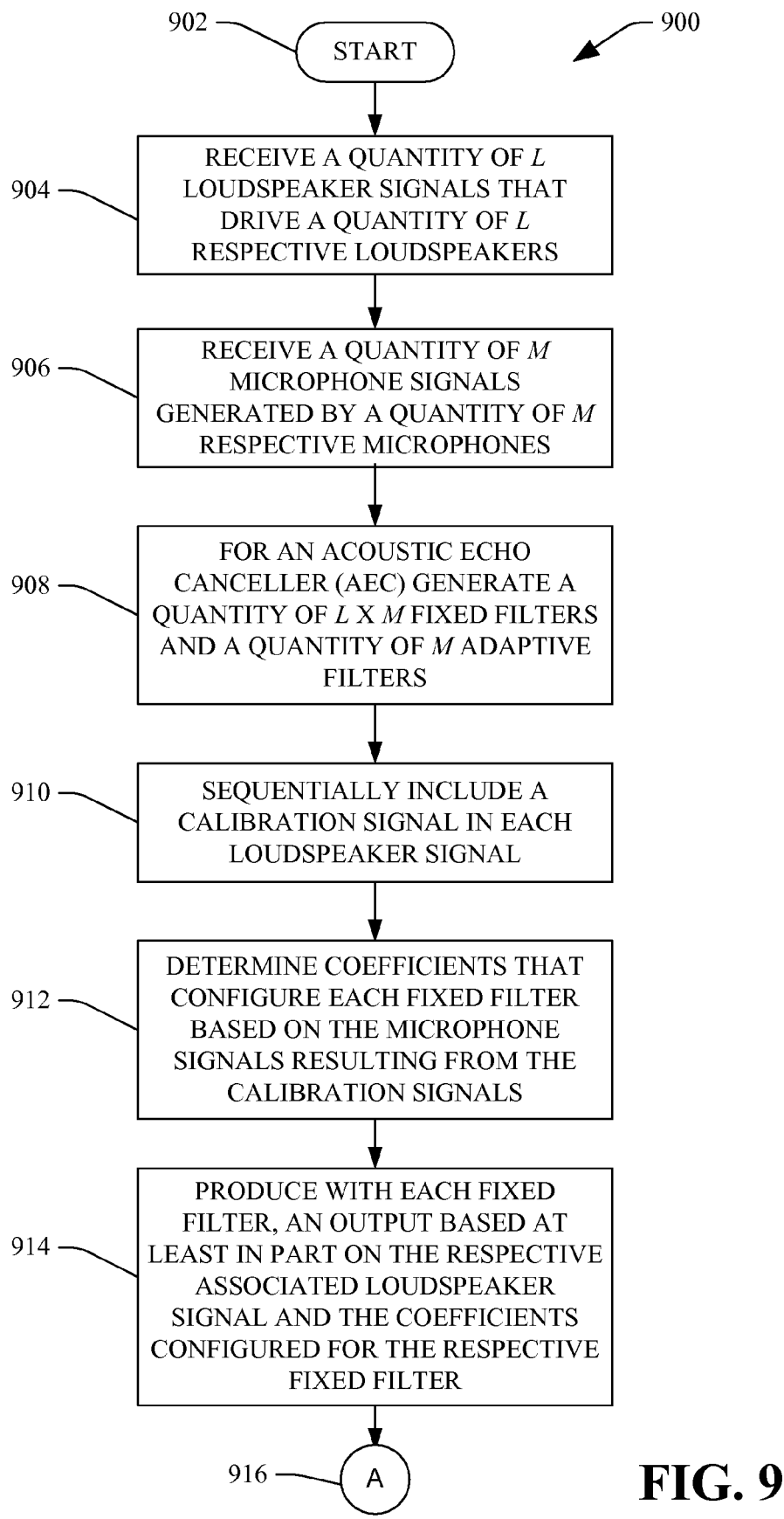
FIG. 9 is a flow diagram that illustrates a first portion of an example methodology for reduction of echo in a device that has multiple loudspeakers.
Figure 10:
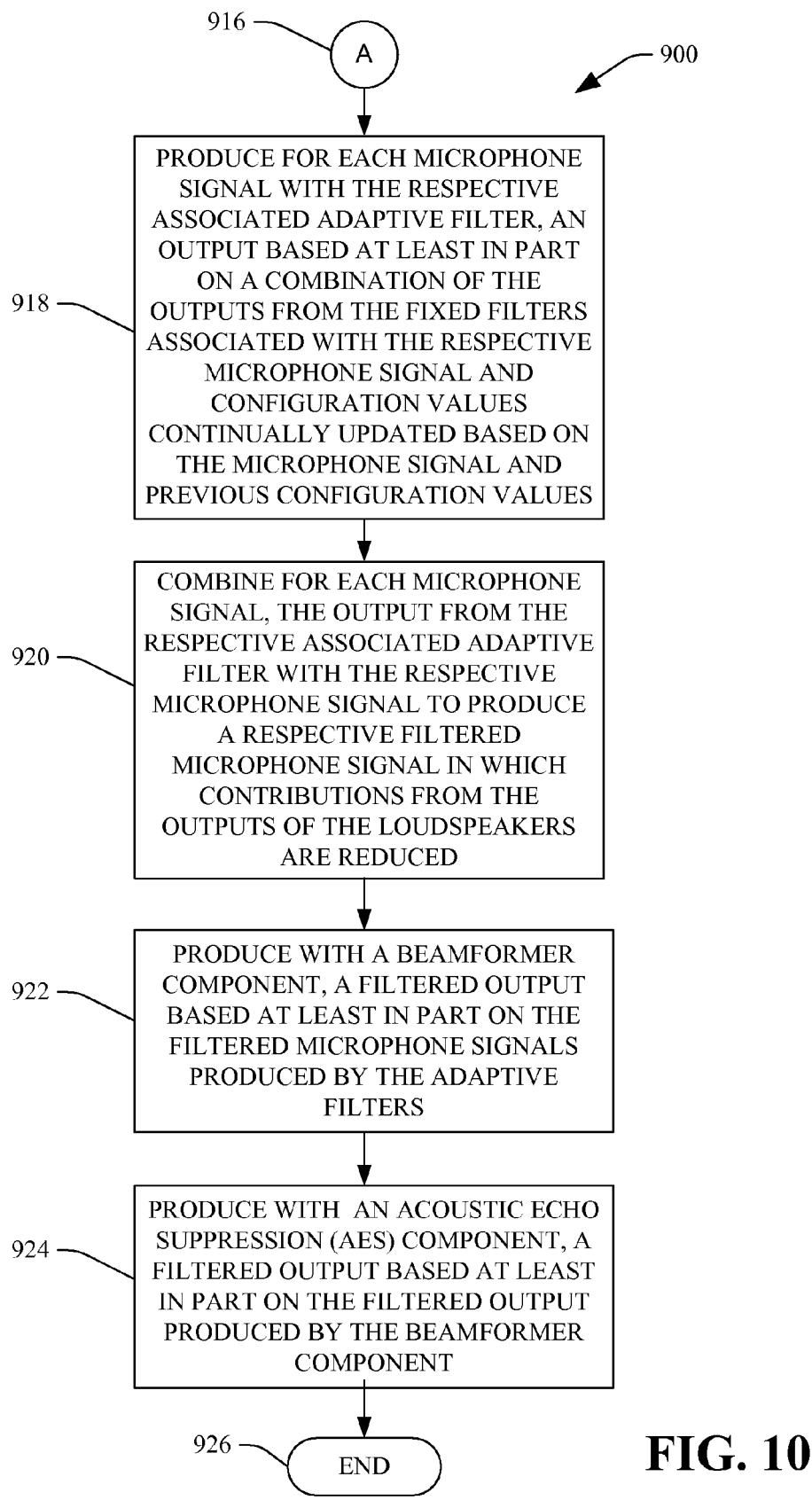
FIG. 10 is a flow diagram that illustrates a second portion of the example methodology for reduction of echo in a device that has multiple loudspeakers.

With reference collectively to FIGS. 9 and 10, an example methodology is illustrated. While the example methodology is described as being a series of acts that are performed in a sequence, it is to be understood that the methodology is not limited by the order of the sequence. For instance, some acts may occur in a different order than what is described herein. In addition, an act may occur concurrently with another act. Also, an act can correspond to inaction such as a time delay. Furthermore, in some instances, not all acts may be required to be implemented in a methodology described herein.

Moreover, the acts described herein may be computer-executable instructions that can be implemented by one or more processors and/or stored on a computer-readable medium, media, or articles. The computer-executable instructions may include a routine, a sub-routine, programs, a thread of execution, and/or the like. Still further, results of acts of the methodologies may be stored in a computer-readable medium, displayed on a display device, and/or the like.

Now referring to FIG. 9, a first portion of an example methodology 900 for reducing echo in a multichannel acoustic system is illustrated. The methodology 900 starts at 902, and at 904 a quantity of L loudspeaker signals is received that drive a quantity of L respective loudspeakers. At 906, a quantity of M microphone signals are received that are generated by a quantity of M respective microphones.

In this example, at 908, an AEC generates a quantity of L×M fixed filters and a quantity of M adaptive filters. Each fixed filter is associated with a different combination of one microphone signal and one loudspeaker signal. Also, each adaptive filter is associated with a respective microphone signal.

At 910, a calibration signal (e.g., a chirp) is sequentially included in each loudspeaker signal. At 912, coefficients are determined that configure each fixed filter based at least in part on the microphone signals resulting from the calibration signals (i.e., the microphone signals received during time periods for which the calibration signals are included in the loudspeaker signals). At 914, each fixed filter produces an output based at least in part on the respective associated loudspeaker signal and the coefficients configured for the respective fixed filter.

Referring to FIG. 10, a further portion of the example methodology 900 is illustrated, continuing at 916. In this portion of the methodology at 918, for each microphone signal, the respective associated adaptive filter produces an output based at least in part on a combination of the outputs from the fixed filters associated with the respective microphone signal and updated configuration values associated with the respective adaptive filter. The AEC component may continually update each adaptive filter with new configuration values based at least in part on the microphone signal associated with the adaptive filter and previous configuration values associated with the adaptive filter. At 920, for each microphone signal, the output from the respective associated adaptive filter is combined with the respective microphone signal to produce a respective filtered microphone signal in which contributions from the outputs of the loudspeakers are reduced.

At 922, a beamformer component produces a filtered output based at least in part on the filtered microphone signals produced by the adaptive filters. Also, at 924, an AES component produces a filtered output based at least in part on the filtered output produced by the beamformer component. The methodology 900 completes at 926.

Figure 11:
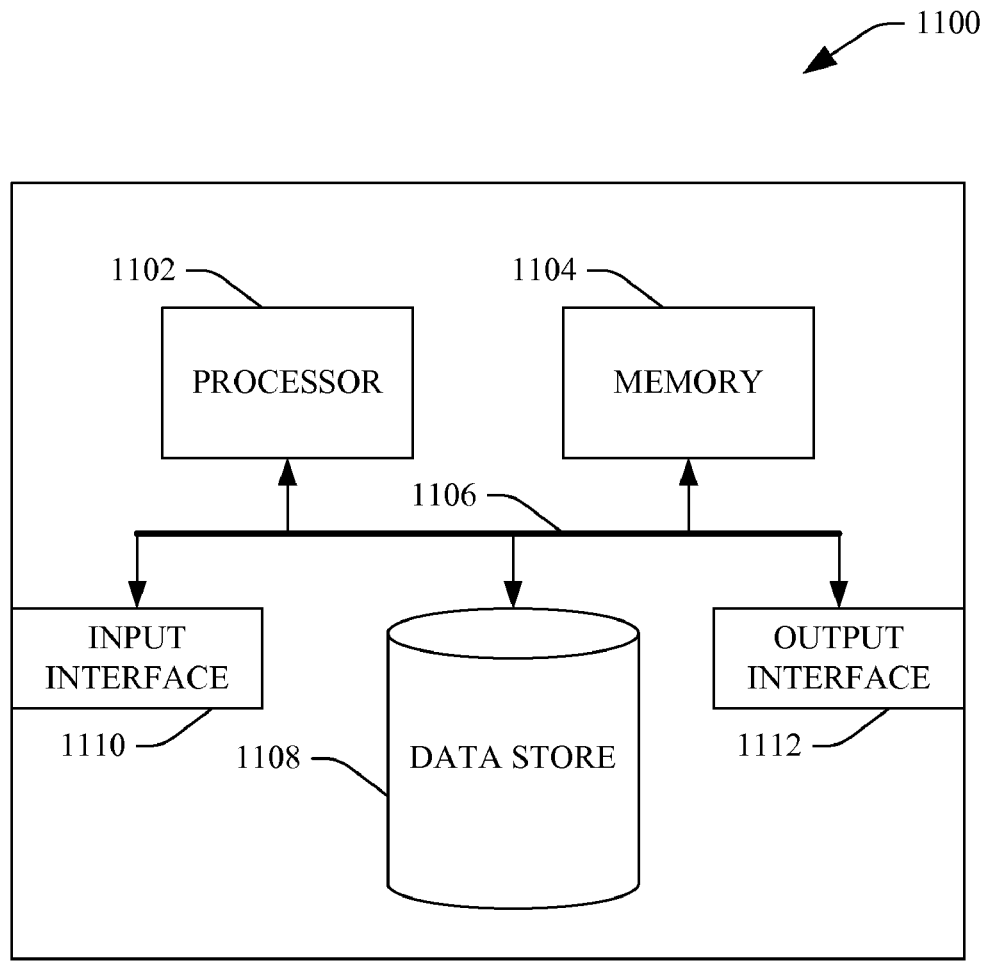
FIG. 11 is an example computing system.

Now referring to FIG. 11, a high-level illustration of an example computing device 1100 that can be used in accordance with the systems and methodologies described herein is depicted. For instance, the computing device 1100 may be used in a system that reduces echo in a multichannel acoustic system.

The computing device 1100 includes at least one processor 1102 that executes instructions that are stored in a memory 1104. The instructions may be, for instance, instructions for implementing functionality described as being carried out by one or more components discussed above or instructions for implementing one or more of the methods described above. The processor 1102 may access the memory 1104 by way of a system bus 1106. In addition to storing executable instructions, the memory 1104 may also store audio signals, fixed filters, adaptive filters, etc.

The computing device 1100 additionally includes a data store 1108 that is accessible by the processor 1102 by way of the system bus 1106. The data store 1108 may include executable instructions, adaptive filters, fixed filters, audio files, chirp signals, etc. The computing device 1100 also includes an input interface 1110 that allows external devices to communicate with the computing device 1100. For instance, the input interface 1110 may be used to receive instructions from an external computer device, receive voice commands from a user, etc. The computing device 1100 also includes an output interface 1112 that interfaces the computing device 1100 with one or more external devices. For example, the computing device 1100 may transmit data to a personal computer by way of the output interface 1112.

Additionally, while illustrated as a single system, it is to be understood that the computing device 1100 may be a distributed system. Thus, for instance, several devices may be in communication by way of a network connection and may collectively perform tasks described as being performed by the computing device 1100.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A multichannel acoustic echo reduction system comprising:
 a signal receiving component that receives a plurality of loudspeaker signals that drive a plurality of respective loudspeakers, and further receives one or more microphone signals generated by one or more respective microphones based at least in part on outputs from the loudspeakers;

an acoustic echo canceller (AEC) component having a fixed filter for each respective combination of loudspeaker and microphone signals and having an adaptive filter for each microphone signal, wherein for each microphone signal, the AEC component modifies the microphone signal to reduce contributions from the outputs of the loudspeakers based at least in part on the respective adaptive filter associated with the microphone signal and the set of fixed filters associated with the respective microphone signal; and a calibration component that provides coefficients that configure each of the fixed filters, wherein the calibration component sequentially includes a calibration signal in each loudspeaker signal and determines the coefficients for each fixed filter based at least in part on the microphone signals received during time periods for which the calibration signals are included in the loudspeaker signals.

2. The system of claim 1, wherein when the receiving component receives L loudspeaker signals and M microphone signals, the AEC component generates a quantity of L×M fixed filters and a quantity of M adaptive filters.

3. The system of claim 1, wherein the signal receiving component receives a plurality of microphone signals generated by a plurality of respective microphones, wherein the plurality of microphone signals is greater than the plurality of loudspeaker signals, further comprising a tracking component that determines relative movement between at least one loudspeaker and microphone and triggers the calibration component to provide updated coefficients for the fixed filters based at least in part upon the determination.

4. The system of claim 1, wherein each fixed filter is associated with a different combination of one microphone signal and one loudspeaker signal, wherein each fixed filter produces an output based at least in part on the respective associated loudspeaker signal and the coefficients configured for the respective fixed filter.

5. The system of claim 4, wherein the signal receiving component receives a plurality of microphone signals generated by a plurality of microphones, wherein each adaptive filter is associated with a respective microphone signal, wherein for each microphone signal, the respective associated adaptive filter produces an output based at least in part on a combination of the outputs from the fixed filters associated with the respective microphone signal and respective configuration values updated based at least in part on the respective microphone signal and respective previous configuration values associated with the respective adaptive filter.

6. The system of claim 5, wherein the adaptive filters produce respective outputs based at least in part on at least one AEC algorithm selected from the group comprising least mean square LMS, normalized least mean square (NMLS), or recursive least squares (RLS).

7. The system of claim 5, wherein for each microphone signal, the respective associated adaptive filter includes a finite impulse response (FIR) filter with a predetermined length to produce an output corresponding to an approximation of a transfer function between the respective microphone signal and the combination of the outputs from the fixed filters associated with the respective microphone signal.

8. The system of claim 5, wherein for each microphone signal, the AEC component combines the output from the respective associated adaptive filter with the respective microphone signal to produce a respective filtered microphone signal.

9. The system of claim 8, further comprising a beamformer component that produces a filtered output based at least in part on the filtered microphone signals produced by the AEC component.

10. The system of claim 9, further comprising an acoustic echo suppression (AES) component that produces a filtered output based at least in part on the filtered output produced by the beamformer component.

11. The system of claim 10, wherein the AES component produces outputs based at least in part on at least one AES algorithm selected from the group comprising a Wiener gain algorithm, an Ephraim, or a Malah algorithm.

12. A method comprising:
receiving a plurality of loudspeaker signals that drive a plurality of respective loudspeakers;
sequentially including a calibration signal in each loudspeaker signal;
receiving a one or more microphone signals generated by one or more respective microphones based at least in part on outputs from the loudspeakers;
with an acoustic echo canceller (AEC) component having a fixed filter for each respective combination of loudspeaker and microphone signals and an adaptive filter for each microphone signal, modifying each microphone signal to reduce contributions from the outputs of the loudspeakers based at least in part on the respective adaptive filter associated with each microphone signal and the set of fixed filters associated with the respective microphone signal; and
determining coefficients that configure each fixed filter based at least in part on the microphone signals received during time periods for which the calibration signals are included in the loudspeaker signals.

13. The method of claim 12, further comprising generating a quantity of L×M fixed filters and a quantity of M adaptive filters when receiving L loudspeaker signals and M microphone signals.

14. The method of claim 12, wherein each fixed filter is associated with a different combination of one microphone signal and one loudspeaker signal, wherein each adaptive filter is associated with a respective microphone signal, further comprising:
receiving a plurality of microphone signals generated by a plurality of respective microphones;
producing with each fixed filter, an output based at least in part on the respective associated loudspeaker signal and the coefficients configured for the respective fixed filter;
producing for each microphone signal with the respective associated adaptive filter, an output based at least in part on a combination of the outputs from the fixed filters associated with the respective microphone signal and respective configuration values updated based at least in part on the respective microphone signal and respective previous configuration values associated with the respective adaptive filter; and
combining for each microphone signal, the output from the respective associated adaptive filter with the respective microphone signal to produce a respective filtered microphone signal.

15. The method of claim 14, further comprising producing a first filtered output based at least in part on the filtered microphone signals produced by the adaptive filters.

16. The method of claim 15, further comprising producing a second filtered output based at least in part on the first filtered output.

17. A computer-readable data storage device comprising instructions that, when executed by a processor, cause the processor to perform acts comprising:

receiving a quantity of L loudspeaker signals that drive a quantity of L respective loudspeakers;

receiving a quantity of M microphone signals generated by a quantity of M respective microphones based at least in part on outputs from the loudspeakers;

for an acoustic echo canceller (AEC) generating a quantity of L×M fixed filters and a quantity of M adaptive filters, wherein each fixed filter is associated with a different combination of one microphone signal and one loudspeaker signal, wherein each adaptive filter is associated with a respective microphone signal;

sequentially including a calibration signal in each loudspeaker signal;

determining coefficients that configure each fixed filter based at least in part on the microphone signals received during time periods for which the calibration signals are included in the loudspeaker signals;

producing with each fixed filter, an output based at least in part on the respective associated loudspeaker signal and the coefficients configured for the respective fixed filter;

producing for each microphone signal with the respective associated adaptive filter, an output based at least in part on a combination of the outputs from the fixed filters associated with the respective microphone signal and respective configuration values updated based at least in part on the respective microphone signal and respective previous configuration values associated with the respective adaptive filter;

combining for each microphone signal, the output from the respective associated adaptive filter with the respective microphone signal to produce a respective filtered microphone signal in which contributions from the outputs of the loudspeakers are reduced;

producing with a beamformer component, a filtered output based at least in part on the filtered microphone signals produced by the adaptive filters; and producing with an acoustic echo suppression (AES) component, a filtered output based at least in part on the filtered output produced by the beamformer component.

* * * * *